(12) United States Patent
Konarski et al.

(10) Patent No.: US 7,547,735 B1
(45) Date of Patent: Jun. 16, 2009

(54) UV CURABLE COMPOSITIONS

(75) Inventors: Mark M. Konarski, Old Saybrook, CT (US); Joel D. Schall, Hamden, CT (US)

(73) Assignee: Henkel Corporation, Rocky Hill, CT (US)

( * ) Notice: Subject to any disclaimer, the term of this patent is extended or adjusted under 35 U.S.C. 154(b) by 188 days.

(21) Appl. No.: 11/566,262

(22) Filed: Dec. 4, 2006

(51) Int. Cl.
*C08J 3/28* (2006.01)
*C08F 2/46* (2006.01)
*C08F 2/50* (2006.01)
*G03F 7/031* (2006.01)
*C08F 4/00* (2006.01)

(52) U.S. Cl. .............. 522/6; 522/46; 522/28; 522/64; 522/7; 522/8; 522/18; 522/120; 522/130; 522/135; 522/178; 427/519; 106/287.23; 106/287.24

(58) Field of Classification Search .......... 522/6, 522/8, 120, 135, 171, 172, 46, 28, 64, 7, 522/18, 130, 178; 106/287.23, 287.24; 427/519
See application file for complete search history.

(56) References Cited

U.S. PATENT DOCUMENTS 6,709,717 B2 * 3/2004 Mushovic .......... 427/518
6,714,712 B2 3/2004 Bishop et al.
6,797,740 B2 * 9/2004 Abel et al. .......... 522/81
7,109,250 B2 9/2006 Wolf et al.
2005/0084123 A1 * 4/2005 Litke et al. .......... 381/312
2005/0101686 A1 * 5/2005 Krohn .......... 522/71

FOREIGN PATENT DOCUMENTS

| EP | 1 376 561 | | 1/2004 |
| JP | 2005076017 A | * | 3/2005 |
| KR | 10-1995-0032245 A | | 12/1995 |
| WO | WO 02/22697 | | 3/2002 |

OTHER PUBLICATIONS

English machine translation of JP 2005-076017.*

* cited by examiner

*Primary Examiner*—Mark Eashoo
*Assistant Examiner*—Michael Pepitone
(74) *Attorney, Agent, or Firm*—Steven C. Bauman

(57) ABSTRACT

The present invention provides a UV curable composition comprising an acrylate component, comprising an acrylate-functionalized hydrogenated polybutadiene, and at least one mono-functional acrylate, and a photoinitiator combination triggered upon exposure to radiation at 365 nm of the electromagnetic spectrum comprising a bisacyl phosphine oxide and benzophenone, where when dispensed at a thickness of about 1 mm and exposed to UV radiation generated at a wavelength of 365 nm the composition cures through the thickness of the dispensed composition at a speed between 40 mm/sec to 100 mm/sec.

8 Claims, No Drawings

UV CURABLE COMPOSITIONS

BACKGROUND OF THE INVENTION

1. Field of the Invention

The present invention provides a UV curable composition comprising an acrylate component, comprising an acrylate-functionalized hydrogenated polybutadiene, and at least one mono-functional acrylate, and a photoinitiator combination triggered upon exposure to radiation at 365 nm of the electromagnetic spectrum comprising a bisacyl phosphine oxide and benzophenone, where when dispensed at a thickness of about 1 mm and exposed to UV radiation generated at a wavelength of 365 nm the composition cures through the thickness of the dispensed composition at a speed between 40 mm/sec to 100 mm/sec.

2. Brief Description of Related Technology

Photocurable compositions are well known. Some may be based on acrylate functional groups, while others are based on vinyl ether or epoxy functional groups. These known photocurable compositions may include materials having oligomeric backbones, where the oligomer is a silicone based material, an acrylate base material, or a urethane base material.

In applications where microelectronic circuitry is to be coded with a curable composition, the material once coated desirably minimizes the ingress of environmental contaminants to that electronic circuitry. Should that not be the case, the environmental contaminants could cause corrosion in the circuitry, leading to electrical disconnect and failure of the electronic component. This clearly is highly undesirable.

While combinations of triphenyl phosphine oxide or bisacyl phosphine oxide with benzophenone have been described, benzophenone is used in these instances as a second photoinitiator. For instance, in International Patent Publication No. WO 02/22697 a methacrylate casting resin is described, in which among other things 0.1-10% phosphine oxide photoinitiator plus 0 to 10% of another photoinitiator, such as a benzophenone.

In addition, European Patent Publication No. EP 1 376 561 speaks to an adhesive composition targeted towards medical and electronics fields. The composition contains a urethane acrylate and an acrylamide, together with a photoinitiator component containing at least one acyl phosphine oxide and at least one additional photoinitiator, such as a benzophenone.

Notwithstanding the state of the art, as shown in the Examples, benzophenone is not a photoinitiator in the inventive composition, and does not itself produce radicals required to initiate polymerization upon exposure to UV light of a 365 nm wavelength, but rather requires an additional electron donor to do so.

Thus, it would be desirable to provide a photocurable composition having robust properties against the ingress of environmental contaminants, while curing at a fast cure profile.

SUMMARY OF THE INVENTION

The present invention provides a UV curable composition comprising an acrylate component, comprising an acrylate-functionalized hydrogenated polybutadiene, and at least one mono-functional acrylate, and a photoinitiator combination triggered upon exposure to radiation at 365 nm of the electromagnetic spectrum comprising a bisacyl phosphine oxide and benzophenone, where when dispensed at a thickness of about 1 mm and exposed to UV radiation generated at a wavelength of 365 nm the composition cures through the thickness of the dispensed composition at a speed between 40 mm/sec to 100 mm/sec.

DETAILED DESCRIPTION OF THE INVENTION

The present invention provides a UV curable composition comprising an acrylate component, comprising an acrylate-functionalized hydrogenated polybutadiene, and at least one mono-functional acrylate, and a photoinitiator combination triggered upon exposure to radiation at 365 nm of the electromagnetic spectrum comprising a bisacyl phosphine oxide and benzophenone.

The bisacyl phosphine oxide should be present in an amount between about 1.5 and about 4 weight percent and the benzophenone present in an amount between about 0.01 and about 1 weight percent. With these percentage ranges, when dispensed at a thickness of about 1 mm and exposed to UV radiation generated at a wavelength of 365 nm the composition cures through the thickness of the dispensed composition at a speed between 40 mm/sec to 100 mm/sec.

More specifically, when the amount of benzophenone relative to bisacyl phosphine oxide is in the range of 0.005 to 0.25, a cure speed of 40 mm/sec may be achieved.

And, when the amount of benzophenone relative to bisacyl phosphine oxide is in the range of 0.025 to 0.5, a cure speed of 100 mm/sec may be achieved.

The UV radiation used to cure the inventive composition may be generated from a variety of UV light sources capable of generating 365 nm radiation. However, a particularly desirable source to generated UV radiation at that wavelength is a LED source.

The UV radiation intensity generated by the source is between about 120 to about 130 mW/cm$^2$.

Cure speed is dependant on the LED power (intensity of UV radiation) and thus higher power would allow for faster cure speeds, all else being equal.

The inventive composition as noted has an acrylate-functionalized hydrogenated polybutadiene as a portion of the acrylate component. This polybutadiene has a molecular weight of about 3,000, as reported by the manufacturer Sartomer, Inc., Exton, Pa. This polybutadiene happens to have hydrophobicity due to the backbone, which lends itself to be particularly useful in commercial applications where the ingress of moisture through the cured composition can foul that which is beneath the composition. For instance, microelectronic circuitry can be harmed if moisture penetrates the cured composition, thereby creating short circuits and a malfunction of the device.

The mono-functional acrylate which is also part of the composition may be chosen from a host of acrylates, such as 2-hydroxyethyl acrylate, 2-hydroxypropyl acrylate, 2-hydroxyethyl acrylate, pentaerythritol triacrylate, 4-hydroxybutyl acrylate, isobornyl acrylate, cyclohexyl acrylate, tetrahydrofurfuryl acrylate, t-butylaminoethyl acrylate, cyanoethylacrylate, chloroethyl (meth)acrylate and lauryl acrylate. The corresponding (meth)acrylates are also embraced by the mono-functional acrylate.

The present invention also provides a method of curing at 365 nm using an LED a UV curable composition at cure speeds within the range of about 40 mm/sec to about 100 mm/sec. This method includes the steps of:

a. dispensing onto a substrate a UV curable composition comprising a photoinitiator combination triggered upon exposure to radiation at 365 nm of the electromagnetic spectrum comprising a bisacyl phosphine oxide and benzophenone, where the bisacyl phosphine oxide is present in an amount between about 1.5 and about 4 weight percent and the benzophenone is present in an amount between about 0.01 and about 1 weight percent; and b. exposing the UV curable composition to UV radiation at a wavelength of 365 nm using an LED, such that the UV curable composition cures at cure speeds within the range of about 40 mm/sec to about 100 mm/sec.

EXAMPLES

In the tables below, various samples were prepared to evaluate the performance in terms of surface cure, cure through depth and cure speed.

TABLE 1A

| Components | Sample | | | | | | | |
|---|---|---|---|---|---|---|---|---|
| | A | B | C | D | E | F | G | H |
| CN9014* | 60.1 | 60.1 | 60.1 | 60.1 | 60.1 | 60.1 | 60.1 | 60.1 |
| IBOA | 25.59 | 22.59 | 22.1 | 21.6 | 24.1 | 23.6 | 25.1 | 24.6 |
| Lauryl Acrylate | 12.3 | 12.3 | 12.3 | 12.3 | 12.3 | 12.3 | 12.3 | 12.3 |
| Irgacure 819 | 2 | 5 | 5 | 5 | 3 | 3 | 2 | 2 |
| Benzophenone | 0.01 | 0.01 | 0.5 | 1 | 0.5 | 1 | 0.5 | 1 |

*CN9014 is reported by the manufacturer, Sartomer Inc., to be a hydrophobic urethane acrylate oligomer having a hydrogenated polybutadiene backbone. CN9014 is reported to offer good chemical resistance and electrical properties.

TABLE 1B

| Components | Sample | | | | | | | |
|---|---|---|---|---|---|---|---|---|
| | I | J | K | L | M | N | O | P |
| CN9014 | 60.1 | 60.1 | 60.1 | 60.1 | 60.1 | 60.1 | 60.1 | 60.1 |
| IBOA | 25.5 | 23.1 | 22.6 | 25.6 | 25.5 | 26.1 | 25.6 | 25.6 |
| Lauryl Acrylate | 12.3 | 12.3 | 12.3 | 12.3 | 12.3 | 12.3 | 12.3 | 12.3 |
| IRGACURE 819 | 2 | 4 | 4 | 2 | 2 | 1 | 1 | 2 |
| Benzophenone | 0.1 | 0.5 | 1 | 0.05 | 0.1 | 0.5 | 1 | 0 |

In the table below, the performance of these samples is reported. Surface cure is determined by a visual inspection when the surface is dry to the touch, after exposure to UV radiation at a wavelength of 365 nm and intensity of 120 to about 130 mW/cm² generated by a LED (commercially available from Panasonic as Aicure LED SPOT TYPE, model ANUJ5014). Cure through volume is determined by a visual inspection of when no liquid is observed beneath the surface of the cured composition, again after exposure to UV radiation at a wavelength of 365 nm and intensity of 120 to about 130 mW/cm² generated by a LED.

TABLE 2A

| Cure results | Sample | | | | | | | |
|---|---|---|---|---|---|---|---|---|
| | A | B | C | D | E | F | G | H |
| 40 mm/sec | Ok | ICTD | ICTD | ICTD | — | — | — | — |
| 60 mm/sec | ICTD | — | — | — | Ok | Ok | — | — |
| 80 mm/sec | — | — | — | — | ICTD | ICTD | — | — |
| 100 mm/sec | — | — | — | — | — | — | Ok | Ok |
| 120 mm/sec | — | — | — | — | — | — | ICTD | ICTD |

TABLE 2B

| Cure results | Sample | | | | | | | |
|---|---|---|---|---|---|---|---|---|
| | I | J | K | L | M | N | O | P |
| 40 mm/sec | — | Ok | Ok | — | — | ISC | ISC | ICTD |
| 60 mm/sec | — | ICTD | ICTD | — | — | — | — | — |
| 80 mm/sec | Ok | — | — | — | Ok | — | — | — |
| 100 mm/sec | ICTD | — | — | — | Ok | ICTD | — | — |
| 120 mm/sec | — | — | — | ICTD | — | — | — | — |

In Tables 2A and 2B, Ok indicates a cure through the depth of the dispensed composition; ICTD indicates the observation of liquid beneath a surface cure and thus incomplete cure through depth; and ISC indicates the observation of incomplete surface cure.

What is claimed is:

1. A UV curable composition comprising:
    a acrylate component, comprising an acrylate-functionalized hydrogenated polybutadiene and at least one monofunctional (meth)acrylate,
    a combination of bisacyl phosphine oxide present in an amount between about 1.5 and about 4 weight percent and benzophenone present in an amount between about 0.01 and about 1 weight percent, wherein when dispensed at a thickness of about 1 mm and exposed to radiation at a wavelength of 365 nm at an intensity of between about 120 to about 130 mW/cm² the composition cures through the thickness of the dispensed composition at a speed between 40 mm/sec to 100 mm/sec.

2. The composition of claim 1, wherein the amount of benzophenone relative to bisacyl phosphine oxide is in the range of 0.005 to 0.25.

3. The composition of claim 2, wherein the cure speed is 40 mm/sec.

4. The composition of claim 1, wherein the amount of benzophenone relative to bisacyl phosphine oxide is in the range of 0.025 to 0.5.

5. The composition of claim 4, wherein the cure speed is 100 mm/sec.

6. The composition of claim 1, wherein the acrylate-functionalized hydrogenated polybutadiene has a molecular weight of about 3,000.

7. The composition of claim 1, wherein the mono-functional (meth)acrylate is selected from the group consisting of 2-hydroxyethyl acrylate, 2-hydroxypropyl acrylate, 2-hydroxyethyl methacrylate, pentaerythritol triacrylate, 4-hydroxybutyl acrylate, isobornyl acrylate, cyclohexyl acrylate, tetrahydrofurfuryl acrylate, t-butylaminoethyl acrylate, cyanoethylacrylate, chloroethyl (meth)acrylate and lauryl acrylate and their corresponding mono-functional (meth)acrylates.

8. A method of curing at 365 nm at an intensity of between about 120 to about 130 mW/cm² using an LED a UV curable composition at cure speeds within the range of about 40 mm/sec to about 100 mm/sec, comprising the steps of:
    a) dispensing onto a substrate a UV curable composition comprising an acrylate component, comprising an acrylate-functionalized hydrogenated polybutadiene and at least one mono-functional (meth)acrylate, bisacyl phosphine oxide and benzophenone, wherein the bisacyl phosphine oxide is present in an amount between about 1.5 and about 4 weight percent and the benzophenone is present in an amount between about 0.01 and about 1 weight percent; and b) exposing the UV curable composition to UV radiation at a wavelength of 365 nm at an intensity of between about 120 to about 130 mW/cm$^2$ using an LED, such that the UV curable composition cures at cure speeds within the range of about 40 mm/sec to about 100 mm/sec.

* * * * *